(12) United States Patent
Alter et al.

(10) Patent No.: US 7,610,568 B2
(45) Date of Patent: Oct. 27, 2009

(54) METHODS AND APPARATUS FOR MAKING PLACEMENT SENSITIVE LOGIC MODIFICATIONS

(75) Inventors: Stephanie L. Alter, Allentown, PA (US); Vishwas Rao, Breinigsville, PA (US)

(73) Assignee: Agere Systems Inc., Allentown, PA (US)

( * ) Notice: Subject to any disclaimer, the term of this patent is extended or adjusted under 35 U.S.C. 154(b) by 428 days.

(21) Appl. No.: 11/550,448

(22) Filed: Oct. 18, 2006

(65) Prior Publication Data

US 2007/0094629 A1  Apr. 26, 2007

Related U.S. Application Data

(60) Provisional application No. 60/728,451, filed on Oct. 20, 2005.

(51) Int. Cl.
*G06F 17/50* (2006.01)

(52) U.S. Cl. .............. 716/4; 716/5; 716/9; 716/10; 716/11

(58) Field of Classification Search ............. 716/1, 716/4, 5, 9–11
See application file for complete search history.

(56) References Cited

U.S. PATENT DOCUMENTS

| | | | | |
|---|---|---|---|---|
| 7,127,695 | B2 * | 10/2006 | Huang et al. | 716/10 |
| 2006/0271899 | A1 * | 11/2006 | Tan et al. | 716/13 |
| 2006/0282810 | A1 * | 12/2006 | Dutt et al. | 716/12 |

* cited by examiner

*Primary Examiner*—Sun J Lin
(74) *Attorney, Agent, or Firm*—Mendelsohn, Drucker & Associates, P.C.; Steve Mendelsohn

(57) ABSTRACT

Methods and apparatus are described for making a placement sensitive engineering change to meet design for test requirements. One of the methods includes placing a set of new flops in an already placed chip design to meet functional requirements of an engineering change. The already placed chip design is pruned to create a set of valid flops and valid scan chains based on a set of pruning rules. A unified flop database is generated containing physical location and connection information for the new flops and the set of valid flops. A change file for the new flops, selected valid flops, and valid scan chains associated with the selected valid flops is generated meeting allocation and placement sensitive signal connection rules. The new flops are connected to the selected valid flops allowing design for test requirements to be met.

20 Claims, 11 Drawing Sheets

FIG. 6A

```
FLOP: NAME --------604
    X: co-ordinate --605
    Y: co-ordinate --606
    CHAIN: Number ---607
    Q: signal output net name -----------608
    SI: signal input net name -----------609
    SE: signal input net name -----------610
    SE_DRIVE_PIN: drive pin signal name -611
ENDFLOP
```

FIG. 6B

```
FLOP: NAME ------------624
    X: co-ordinate ------625
    Y: co-ordinate ------626
    CHAIN: UNASSIGNED ---627
    Q:   same name ------------------------628
    SI:  same name ------------------------629
    SE: signal input net name/*Logic0* ----------------630
    SE_DRIVE_PIN: drive pin signal name/Logic0/output -631
ENDFLOP
```

US 7,610,568 B2

METHODS AND APPARATUS FOR MAKING PLACEMENT SENSITIVE LOGIC MODIFICATIONS

RELATED U.S. APPLICATION DATA

The present application claims the benefit of U.S. Provisional Application No. 60/728,451, filed Oct. 20, 2005 which is incorporated by reference herein in its entirety.

FIELD OF THE INVENTION

The present invention relates generally to improved methods and apparatus for making placement sensitive logic modifications, and more particularly, to advantageous techniques for logic modifications by making placement sensitive routing of new signal paths to meet design for test (DFT) requirements.

BACKGROUND OF INVENTION

A chip design containing logic circuits supporting built in self test (BIST) has stringent connectivity and timing requirements. When the logic circuits have been placed and routed to meet all functional and timing requirements, including the BIST requirements, the design is considered complete and ready for release to manufacturing. Enhancements to an existing product or a new product based on an existing chip design may be developed once the existing chip design has been validated. To develop the new enhancements or the new product, modifications may be made to the existing chip design, using an engineering change order (ECO). These modifications may require significant changes with the addition of relatively large functional blocks and changes to existing logic functions.

Large-scale modifications to an existing chip design can be exceptionally difficult due to the absence of an automated process to change the existing chip design while satisfying strict connectivity, scan chain length, data transfer requirements of design for test (DFT), and timing requirements of BIST. It is also desirable to mitigate risk and minimize the impact to a current chip database for an existing design when processing an ECO. Prior techniques might require complete DFT redesign, reimplementation, and revalidation of the modified chip. The amount of work using such a prior technique would generally have a negative impact on the design cycle, time to market, and design reuse. In addition, the earlier verified database for the existing chip design, that was verified by the corresponding working silicon, could be completely lost due to the change process for the modifications required during implementing the changes on chip and that would substantially increase risk.

SUMMARY OF INVENTION

Among its several aspects, the present invention recognizes that to minimize design and development time, it is desirable to develop an automated placement sensitive process for making logic modifications. The automated placement sensitive process would allow for a large scale addition of random logic and flip-flops (flops) with minimum disruption to an existing database, while obeying all the constraints and rules required for built in self test (BIST). Such an automated placement sensitive process for handling engineering change orders would allow for significant reuse of an existing chip database, shortening design cycles and making them more predictable, reducing risk, and providing a substantial savings in resources.

To such ends, an embodiment of the present invention includes a method for making a placement sensitive engineering change to meet design for test requirements. A set of new flops are placed in an already placed chip design to meet functional requirements of an engineering change. The already placed chip design is pruned to create a set of valid flops and valid scan chains based on a set of pruning rules. A unified flop database is generated containing physical location and connection information for the new flops and the set of valid flops. A change file for the new flops, selected valid flops, and valid scan chains associated with the selected valid flops is generated meeting allocation and placement sensitive signal connection rules. The new flops are connected to the selected valid flops insuring that design for test requirements are met.

Another embodiment of the present invention addresses a system for insuring that a placement sensitive engineering change meets design for test requirements. Included in the system are a chip database, an engineering change database, and a tool database. The chip database stores an already placed chip design. The engineering change database stores an engineering change order for the already placed chip design. The tool database and a programmed processor provide means for placing a set of new flops in the already placed chip design to meet functional requirements of the engineering change. Means for pruning the already placed chip design to create a set of valid flops and valid scan chains based on a set of pruning rules. Means for generating a unified flop database containing physical location and connection information for the new flops and set of valid flops. Means for generating a change file for the new flops, selected valid flops, and valid scan chains associated with the selected valid flops meeting allocation and placement sensitive signal connection rules. Means for connecting the new flops to the selected valid flops insuring design for test requirements to be met.

Another embodiment of the present invention addresses a computer-readable medium storing a computer program which causes a computer system to perform a method for making a placement sensitive engineering change to meet design for test requirements. A set of new flops are placed in an already placed chip design to meet functional requirements of an engineering change. The already placed chip design is pruned to create a set of valid flops and valid scan chains based on a set of pruning rules. A unified flop database is generated containing physical location and connection information for the new flops and the set of valid flops. A change file for the new flops, selected valid flops, and valid scan chains associated with the selected valid flops is generated meeting allocation and placement sensitive signal connection rules. The new flops are connected to the selected valid flops allowing design for test requirements to be met.

A more complete understanding of the present invention, as well as other features and advantages of the invention, will be apparent from the following detailed description and the accompanying drawings.

BRIEF DESCRIPTION OF DRAWINGS

FIG. 6A illustrates database information entry for a previously existing flop prior to running the placement sensitive ECO process in accordance with an embodiment of the present invention;

FIG. 6B illustrates a database information entry for a new ECO flop with pattern-modification after running the placement sensitive ECO process in accordance with an embodiment of the present invention;

DETAILED DESCRIPTION

The present invention will now be described more fully with reference to the accompanying drawings, in which several embodiments and various aspects of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

Figure 1:
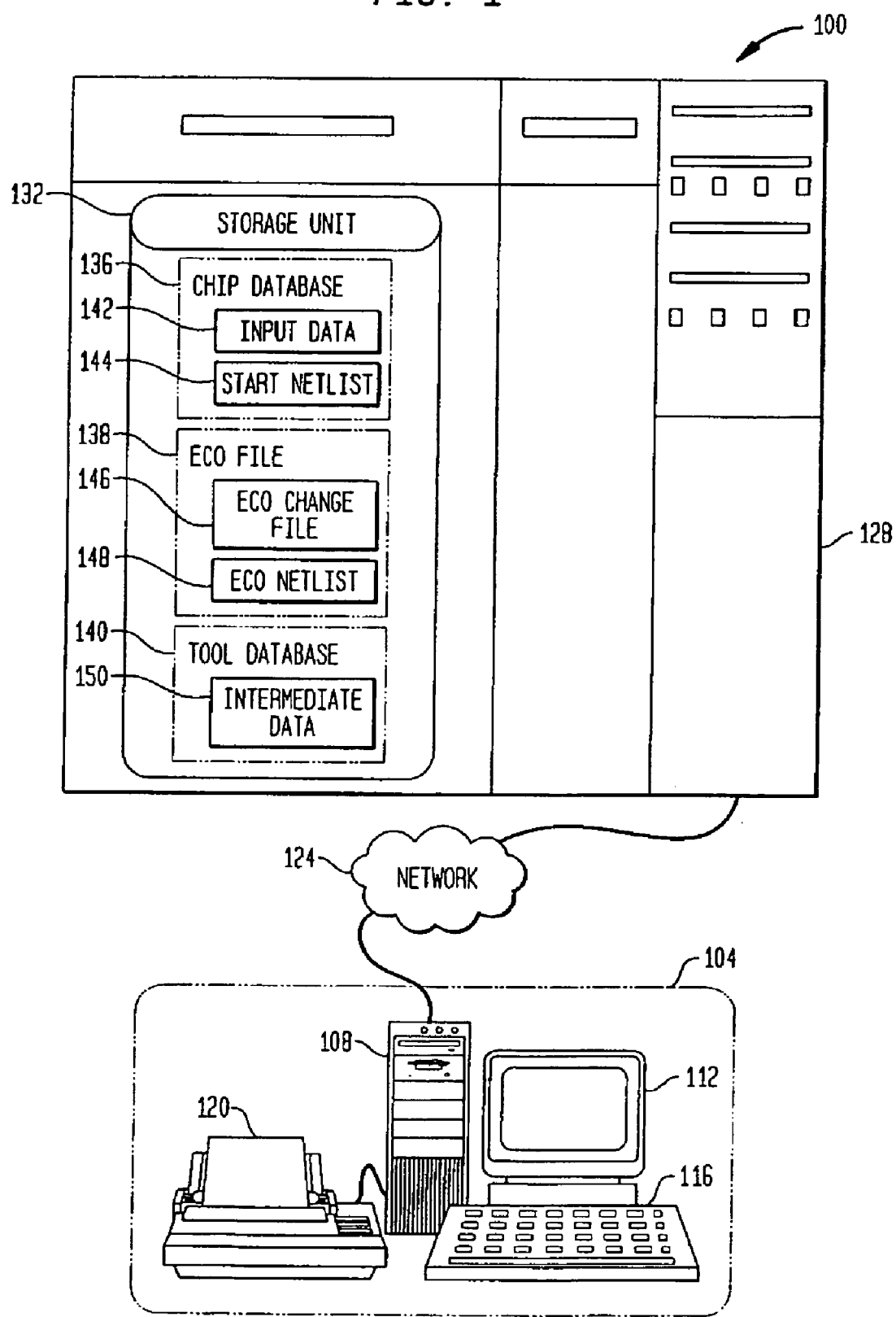
FIG. 1 illustrates an automatic change design system in accordance with an embodiment of the present invention.

FIG. 1 illustrates an automated change design systems 100 in accordance with an embodiment of the present invention. The automated change design system 100 may suitably include a work station 104 consisting, for example, of a processor complex 108, a monitor 112, a keyboard/mouse 116, and may include a printer 120. The work station 104 is connected to a network 124. This connection may be made utilizing the Internet or a local intra-net, for example. The network 124 is then further connected to a processor, such as a server 128 or a server farm, for example. The server 128 contains or is connected to a storage unit 132 having access to a chip database 136, an engineering change order (ECO) file 138, and a tools database 140.

The chip database 136 contains information concerning a chip design, such as, placement information, a circuit synthesized to a technology library with signal paths containing a netlist for all wires in the design, the technology library cells used in the design, and other such input data stored in input databases 142. The chip database 136 may also comprise a start netlist from a chip Verilog database 144. The ECO file 138 contains logic modification information appropriate for an already placed chip design stored in the chip database 136. The ECO may comprise an ECO change file database 146 and an ECO netlist database 148. The tools database 140 contains timing analysis tools, constraint files and parasitic data for signal paths in the design, preprocessing tools, and the like. For example, the parasitic data is made up of distributed resistance and capacitance networks for all the wires in the design and delay calculation tables. These tables contain the relationships between various delay calculation parameters, such as, input-transition-slope, output load, and the like, of a cell that are used to compute the output transition-slope and delay through a cell. The tools database 140 also contains design for test (DFT) tools that check the design for DFT rules violations, generate test vectors, and support simulations for verification of the designs. Intermediate data generated during the processing steps may be stored in an intermediate database 150.

Once a chip design system or process has completed placement, routing, timing and test verification on a chip design, the chip design system or process then proceeds through final physical design release steps leading to the manufacture of the chip. A chip will also typically include built in self test (BIST) facilities which have stringent connectivity and timing requirements. During this design and computation intensive process and after the chip has been released, engineering chances may occur not only to correct problems in a design, but to extend a design with new capabilities for a different chip product. An engineering change order (ECO) may be significant in the scope of changes to a chip design that has already been placed, routed, and verified to meet timing and test requirements. An advantageous placement sensitive large-scale ECO process in accordance with the present invention may suitably employ a number of preprocessing, timing, and design for test tools. Such tools are described in further detail below and are also operative in the server 128 and may be controlled by the work station 104. The ECO tools may be stored as electronic media in the storage unit 132 on a high density disk drive, an optical disk drive, or the like. The ECO tools, accessible from a computer-readable medium, may also be downloaded over a communication network from a remote network device, such as a server or mass storage unit.

An ECO methodology is used to allow placement sensitive large-scale ECOs for circuits containing built in self test (BIST). BIST functionality may be facilitated by LogicVision™'s LogicBIST tool, for example. Circuits containing logicBIST circuits have stringent connectivity and timing requirements that must be met for the ECO to succeed. One of the goals of the ECO methodology of the present invention is to limit the impact to an existing chip database where possible in order to retain as much of the previous placement and routing as is feasible under the circumstances.

The ECO methodology of the present invention provides automation and optimization capabilities. Due to the complexity of a chip design and changes to the design, automation provides design rules checking, automated process features that can be applied across blocks of logic, and support for iterative steps. In order to minimize the impact to placement and routing of a previous chip design and meet logicBIST timing requirements, optimization steps are provided to take into account the placement for logic circuits and determine shortest routing paths for the changed section of the design. In addition, the logic insertion, placement, routing, and verification steps are modular in order to minimize iteration time if minimal chip database changes were made between design iterations, and for adding features to logic sections of the chip design in the future.

The ECO methodology is designed to accommodate these requirements by having three core segments: pre-processing, allocation and optimization, and ECO-implementation. The objectives of pre-processing are to convert available input data to an intermediate form for easy use by downstream optimization engines and to minimize time lost in data-parsing, if iterations are required, by creation of streamlined databases. Further objectives of the pre-processing segment include pruning data for use by optimization engines to improve their efficiency and preprocessing of data to eliminate tool dependent traits, such as, escaped formatting of special characters. Some tools accept "[" "]" and other such characters smoothly while other tools have problems with them. Therefore, these special characters need to be "escaped" (using a "\") while providing the information to such tools. The pre-processing segment takes care of such issues.

The primary objectives of the allocation and optimization segment is to carry out the actions required to make the design logicBIST compliant and to prepare the Astro™ ECO files. Astro™ is an integral part of a Synopsys® physical implementation solution that enables designers to place and route high-performance, complex aid challenging designs. In the approach used here, a new flop allocation and optimization tool is provided that is based on the requirements and the type of ECO to handle the additional flops added as a result of the ECO. A flop is a short hand name for a flip-flop, such as a D-type clocked storage element. The new flop allocation/optimization tool is used to add new flops to existing scan chains.

An objective of the ECO Implementation involves carrying out the modification is required by the ECO using Astro™. The implementation of the ECO results in the generation of a netlist which is subsequently verified for functional correctness and for logicBIST rule compliance. The netlist Astro-database is subsequently used for further place and route activities.

Figure 2:
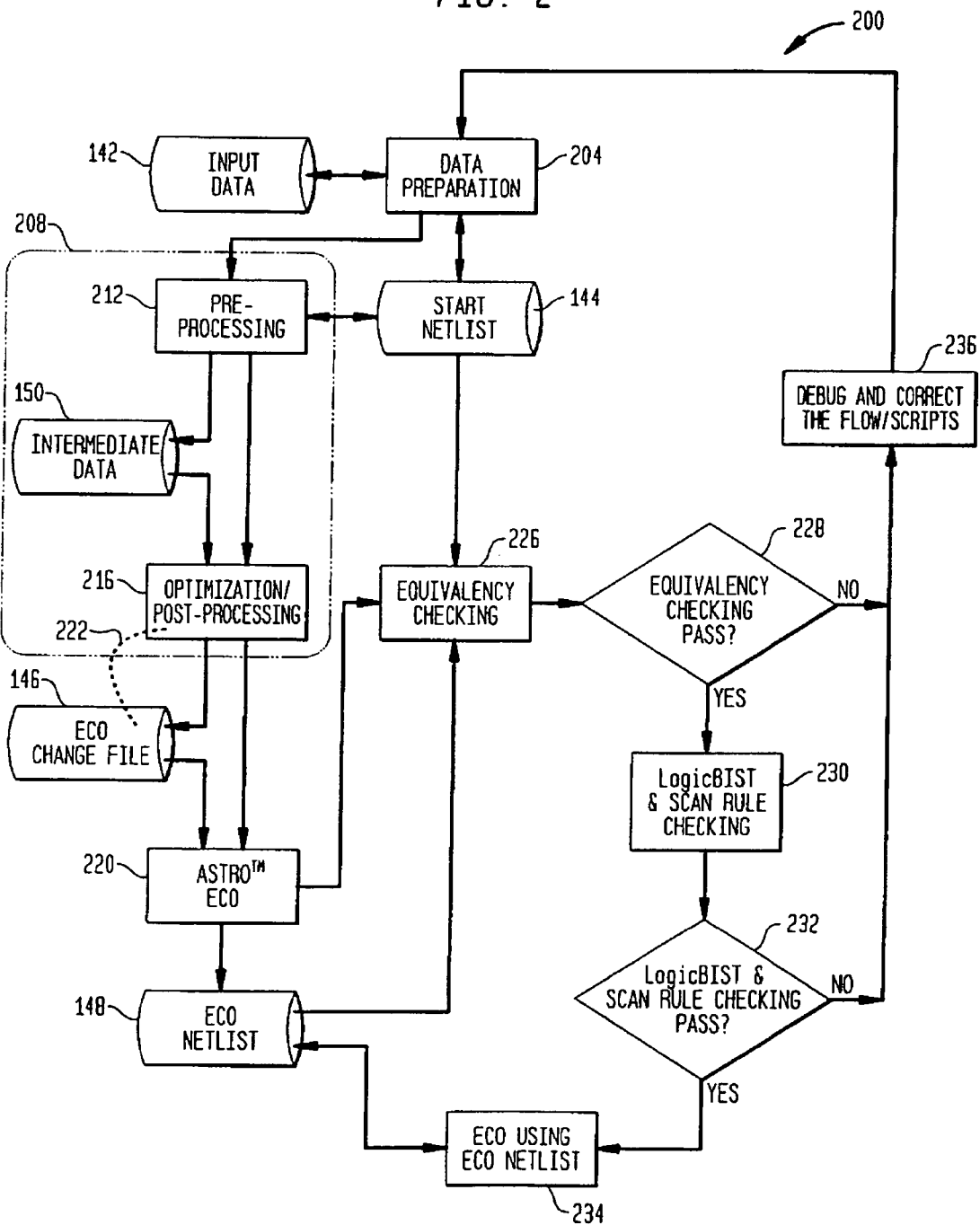
FIG. 2 illustrates an exemplary placement sensitive engineering change order (ECO) process in accordance with an embodiment of the present invention.

FIG. 2 illustrates an exemplary placement sensitive engineering change order (ECO) process 200 in accordance with an embodiment of the present invention. The ECO process 200 for modifying a chip design begins with a data preparation step 204 which collects data in the form of a netlist, physical information, and DFT data, for example, from the input databases 142. The ECO process 200 proceeds to a placement sensitive DFT optimization process 208 having a pre-processing step 212, the intermediate data database 150, and an optimization post-processing step 216.

The chip design has a Verilog structural start netlist which is stored in the chip Verilog database 144. In a pre-processing step 212, data from the data preparation step 204 and the start netlist from the chip Verilog, database 144 are gathered and prepared for optimization and implementation steps to follow. The pre-processing step 212 is made up of data preparation, new-flop list generation, data pruning, connection generation, and flop database generation steps as will be described in more detail below. The data generated by the pre-processing step 212 is stored in the intermediate data database 150. In an optimization and post-processing step 216, data from the intermediate data database 150 is processed to allocate ECO flops to existing test scan chains and generate an Astro™ ECO command file to carry out the ECO. The details of the optimization and post-processing step 216 are stored in the ECO change file database 146. In an Astro™ ECO process step 220, the ECO is carried out using information obtained from the ECO change file database 146. The process of going from the optimization and post-processing step 216, through generating the ECO change file database 146, and carrying out the ECO in the Astro™ ECO process step 220 is normally completely automated. In specific rare cases, a minor peculiarity in tool interpretation may require very limited manual intervention 222 to the ECO change file database 146.

The Astro™ ECO process step 220 generates a Verilog ECO netlist stored in the ECO netlist database 148. Equivalence checking step 226 ensures and verifies that the start netlist from the chip Verilog database 144 and the Verilog ECO netlist from the ECO netlist database 148 are functionally the same. In decision step 228, it is determined whether the two databases pass the equivalency checking. If equivalency checking is passed, then the placement sensitive ECO process 200 proceeds to a logic BIST and scan rule-checking step 230. In step 230, logicBIST and scan rule checking is done to ensure compliance with DFT rules. In decision step 232, it is determined whether the rule-checking step 230 passed. If step 232 passes, then the process 200 proceeds to ECO using ECO netlist step 234. In step 234, the ECO is physically implemented using the ECO netlist obtained from the ECO netlist database 148. Debugging step 236 is used if there are rules failures as determined by the equivalency checking step 228 and the rules checking step 232.

Returning to the pre-processing step 212, an objective of the pre-processing step 212 is to generate unified-flop-data which is stored in the intermediate database 150. The unified-flop-data is utilized by the optimization and post-processing step 216. The pre-processing step 212 carries out the sub-task of data preparation, new flop list generation, data pruning, connection generation, and flop database generation steps which are discussed in further detail below.

The new flop list generation sub-task of the pre-processing segment 212 deals with generating a list of new flops involved in the ECO. The new flop list is developed by first generating, for example, a list of the synchronous D type flip flops (SDFF*) in the original chip netlist and in a new netlist, such as the chip Verilog database 144. Then the difference between the two netlists is found which represent the new flops that were added into the new netlist. It is noted that, the asterix on SDFF* is filled in with and indication of the different drive strength and output types used in the specific added flops.

Figure 3:
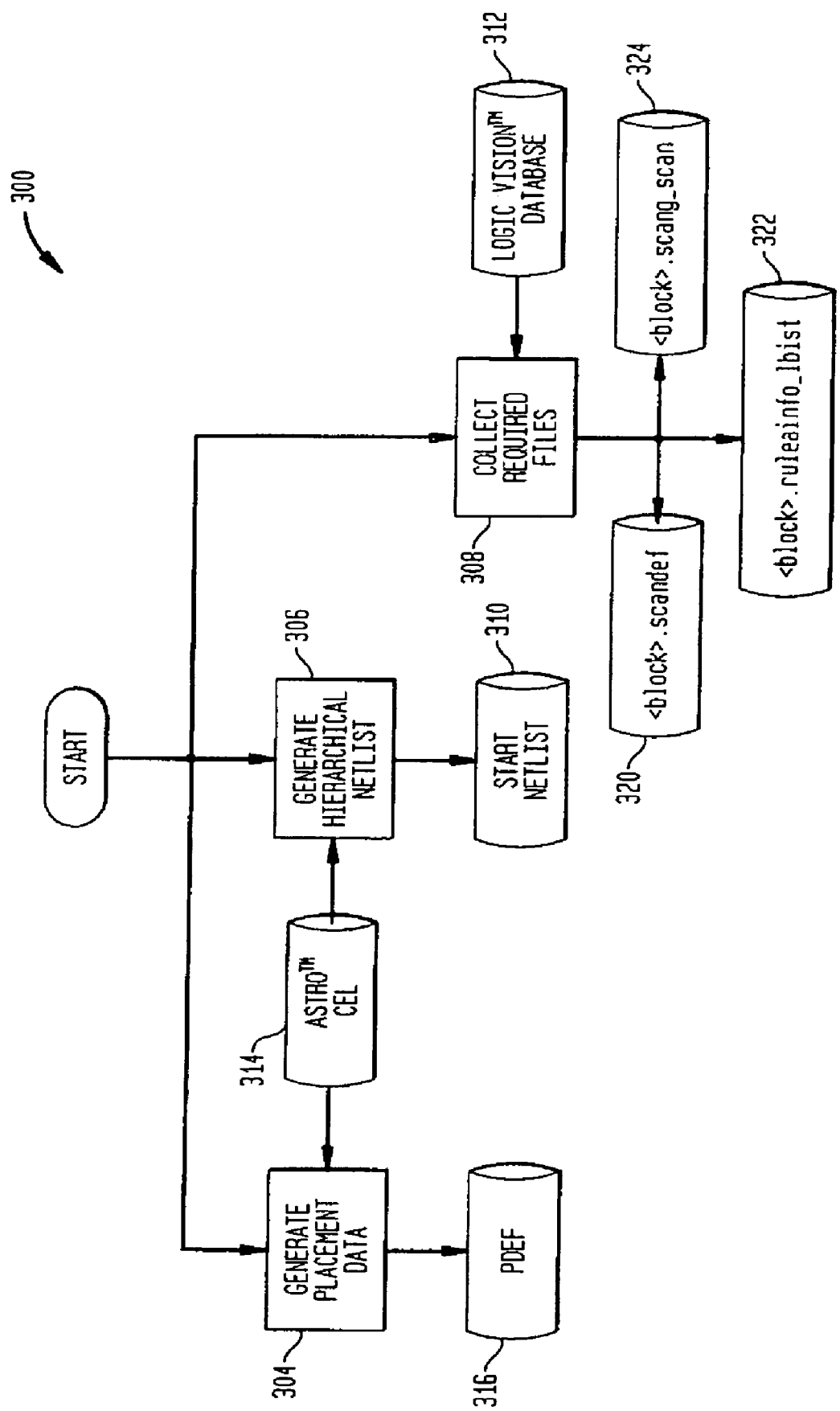
FIG. 3 illustrates an exemplary data preparation process in accordance with an embodiment of the present invention.

FIG. 3 illustrates an exemplary data preparation process 300 in accordance with an embodiment of the present invention. The data preparation process 300, suitable for use as data preparation step 204, consists of three steps, a generate placement data step 304, a generate hierarchical netlist step 306, and a collect required files step 308. These steps are shown as being done in parallel but may suitably be done in a sequential manner. An Astro™ CEL database 314 is a database which contains the logical and physical information of all the new ECO flops placed and connected in order to meet functional and timing requirements. A LogicVision™ database 312 contains a signoff version of the netlist of the design prior to the engineering change. The generate placement data step 304 accesses the Astro™ CEL database 314 and stores placement data in a placement data exchange format (PDEF) in PDEF database 316. The generate hierarchical netlist step 306 accesses the Astro™ CEL database 314 and stores the start netlist in a chip Verilog database 310, such as the chip Verilog database 144 of FIG. 1. The collect required files step 308 accesses the LogicVision™ database 312 and generates three files, <block>.scandef file 320, <block>.ruleainfo_lbist file 322, and <block>.scang_scan file 324. The <block>.scandef file 320 is a scan definition file which provides, for example, scan chain information for the design including the cells used in a scan chain, the sequence of connections, and the grouping of connections, if any. The <block>.ruleainfo_lbist file 322 provides, for example, information on logic built in self test related sub chains used. The <block>.scang_scan file 324 provides, for example, information on the collars or isolation wrappers associated with the scan chains.

Figure 4A:
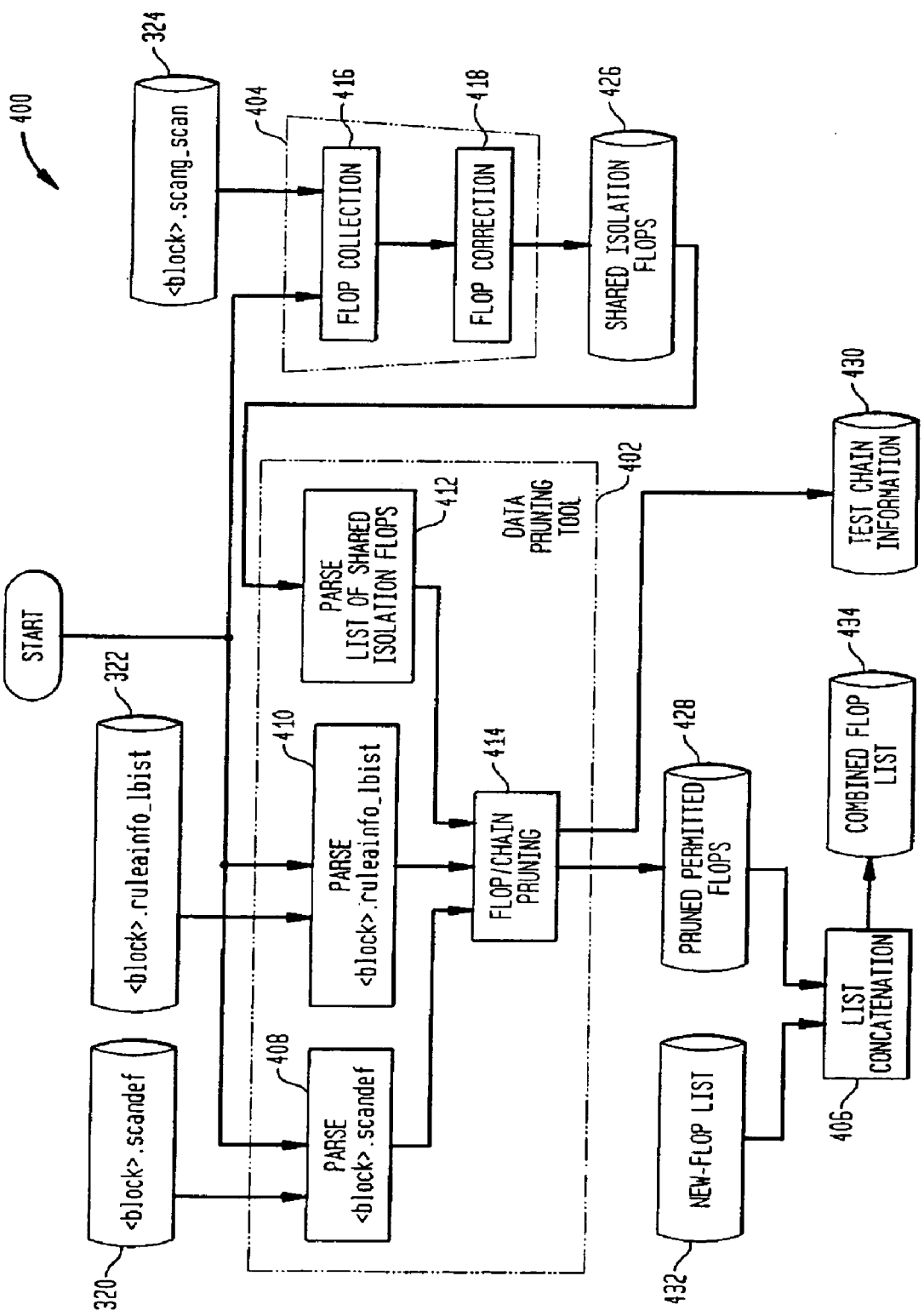
FIG. 4A illustrates an exemplary data pruning process in accordance with an embodiment of the present invention.

FIG. 4A illustrates an exemplary data pruning process 400 as part of the pre-processing step 212 of FIG. 2 in accordance with an embodiment of the present invention. Data pruning is used to eliminate non-required flops and scan chains from the optimization. The non-required flops, for example, use a data exchange format (DEF) for exchanging placement information of cells and to specify the flops as DEF wrapper flops. The data pruning process 400 may be implemented by a data pruning tool 402, an isolation pruning process 404, and a list concatenation step 406. The data pruning tool 402 may suitably perform parsing steps 408, 410, and 412 and a flop/chain pruning step 414. The isolation pruning process 404 comprises a flop collection step 416 and a flop correction step 418. Parsing steps 408 and 410 and flop collection step 416 are shown as operating in parallel, but may suitably be operated in a sequential manner. The parsing step 408 parses data from the <block>.scandef file 320 to collect scannable flops from floating and ordered groups of flops. The parsing step 410 parses data from the <block>.ruleainfo_lbist file 322 to obtain a list of multi-cycle scan chains. The flop collection step 416 accesses the <block>.scang_scan file 324 to collect a list of flops constituting the shared isolation wrappers. The flop correction step 418 corrects the names of flops, if required, to match the original chip netlist. The list of flops with names corrected is stored in a shared isolation flops file 426. The shared isolation flops file 426 is accessed by the parsing step 412 to parse the list of shared isolation flops. The results of the parsing steps 408, 410, and 412 are piped to the flop/chain pruning step 414 which produces a list of valid flops from the original chip design that can be used for the ECO connections as permitted by the rule set for optimization. The list of valid flops is stored in a pruned permitted flops file 428. The flop/chain pruning step 414 also generates a test chain information file 430. The test chain information file 430 contains chain information for the flops in the chip design.

The list concatenation step 406 accesses the pruned permitted flops file 428 and a new-flop list file 432 to combine the list of valid flops with a list of newly added flops to produce a combined flop list file 434 for the ECO process. The new flop list file 432 contains a list of flops in the new netlist. The new netlist can be derived by multiple sources. For example, by comparing the original and new netlists, or by parsing the ECO-change file generated by Astro.

This data pruning process 400 carries out the generation of the flops and scan chains required by the allocation and optimization segment. The flop/chain pruning step 414 uses a set of pruning rules in order to arrive at a list of flops and scan chains permitted for use by the allocation and optimization segment. In the flop/chain pruning step 414, a program reads in the following files: <block>.scandef, <block>.ruleainfo_lbist, and <block>.scang_scan.

The pruning engine uses a first generation exclusion ruleset that, for example, excludes the flops and scan chains added to the ECO design that are not in a single clock domain and that are not single cycle paths to and from the ECO flops. As an example, in a specific chip following the process of this invention, all the ECOs were done in the main M-clock domain, which was the largest clock domain on the chip. Typically, most large scale ECOs involve a single clock domain, such as, the M-clock domain used in the example chip.

The presence of the above two determinations allows the optimization engine to be simplified. In addition, later rule analysis may determine that if any of the new flops communicated with an I/O, they would require special treatment during the top-level testing or would need to be cut off from the top level testing. An interception and gating step would cut such flops from the top level testing. As a consequence, none of the new ECO flops that are added to the original design should receive or send data to a block I/O, with the exception of new I/Os, which are gated off in the LogicBIST and scan modes. This simplification eliminated a requirement for special dedicated/shared isolation structures, or selective combinational path interception and gating to correct rule violations. In this way, the ECO can be implemented without impacting the top level testing.

In one embodiment, the first generation set of pruning rules may suitably employ five basic rules. A first rule concerns the pruning of flops and scan chains associated with a dedicated isolation DEF wrapper flop. If a chain contains some isolation flops and some internal flops, the rule conservatively prunes the whole chain for optimization. Generally, all wrapper flops and any chain associated with the wrapper flops are pruned to avoid rule violations concerning the isolation and testing of embedded logic test (ELT) circuitry. Use of ELT circuitry is a design for test technique where the logic that tests a circuit is embedded in the chip.

A second rule concerns the pruning of flops and scan chains associated with a shared isolation chain. This second rule also prevents rule violations concerning the isolation and testing of ELT circuitry. A third rule concerns the pruning of multi-cycle (MCP) flops and scan chains, since the ECO flops are generally designed to be single-cycle flops. A fourth rule concerns the pruning of memory built in self test (MemBIST or MBIST) flops and scan chains. MBIST chains are used differently than other chains, so we do not want to intercept them, where intercepting means adding a scanable flip-flop in a chain of MBIST type flip flops. A fifth rule concerns the pruning of LogicBIST controller flops and scan chains. Pruning removes these flops and scan chains from the list of flops and scan chains used for the ECO optimization. This rule ensures that new flops are not added to scan chains that contain controller flops to avoid DFT rule violations.

Figure 4B:
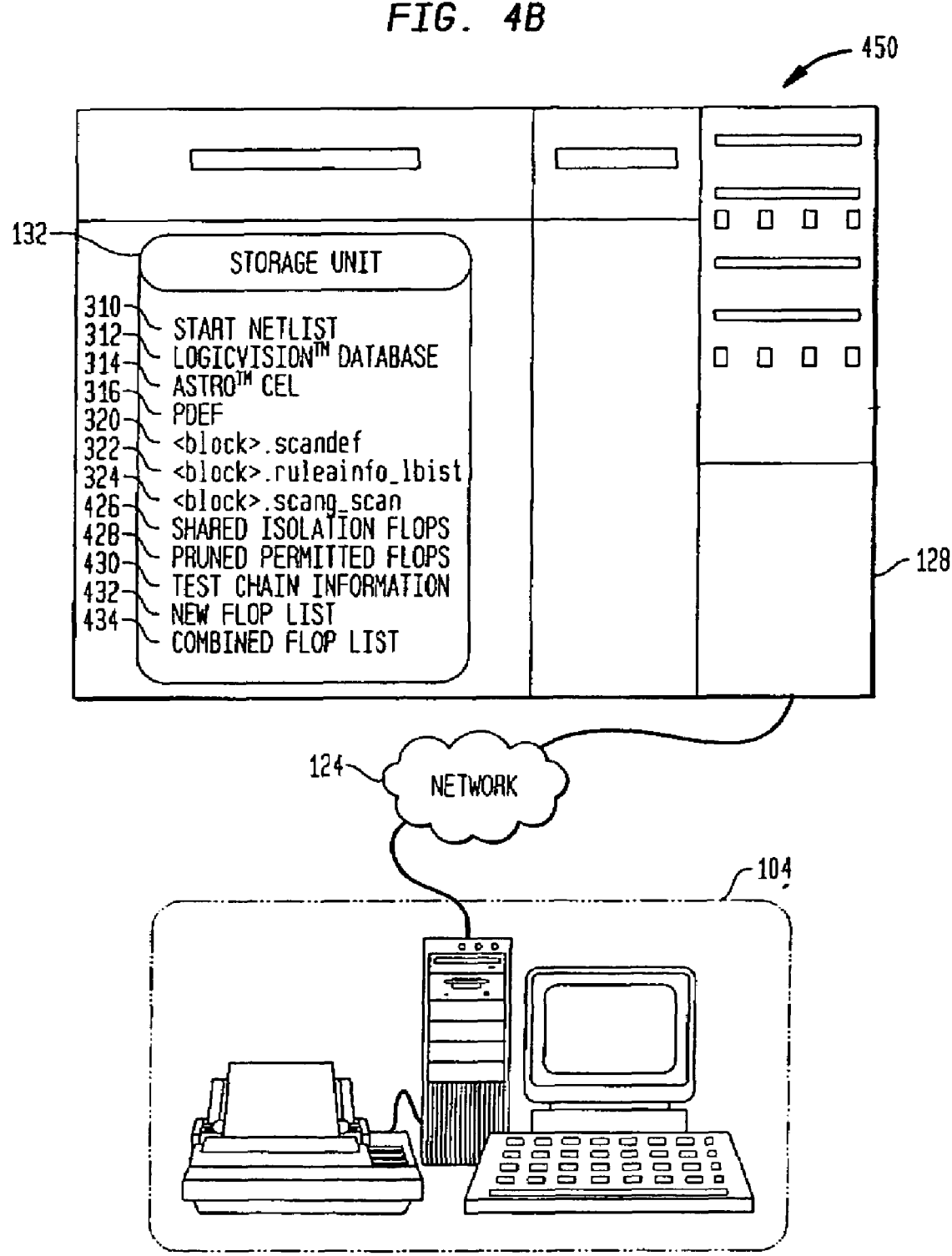
FIG. 4B illustrates the automatic change design system of FIG. 1 further comprising exemplary files and databases as shown in FIGS. 3 and 4A in accordance with an embodiment of the present invention.

FIG. 4B illustrates the automatic change design system of FIG. 1 further comprising exemplary files and databases 310, 312, 314, 316, 320, 322, 324, 426, 428, 430, 432, and 434 as shown in FIGS. 3 and 4A. It will be recognized that alternative storage units, distributed storage units, and other storage means may be employed for the storing of such files.

Figure 5:
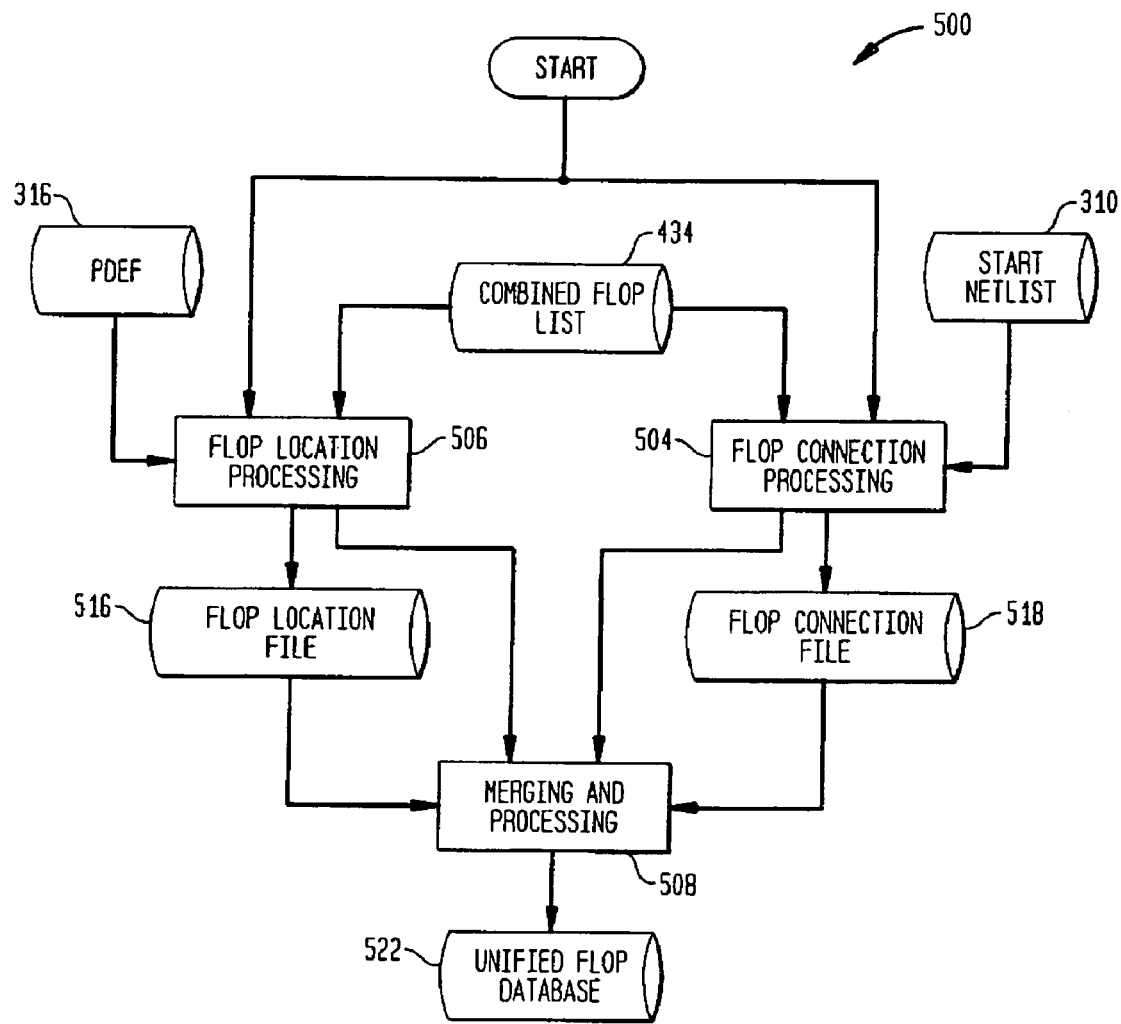
FIG. 5 illustrates an exemplary connection and unified flop database generation process in accordance with an embodiment of the present invention.

FIG. 5 illustrates an exemplary connection and unified flop database generation process 500 in accordance with an embodiment of the present invention. The connection and unified flop database generation process 500 includes a flop connection processing step 504, a flop location processing step 506, and a merging and processing step 508. The flop connection processing step 504 and the flop location processing step 506 are shown as being done in parallel but can suitably be done in a sequential manner. The flop connection processing step 504 involves generating the connection information for all the flops in the combined flop list file 434. Generating the connection information consists of accessing the flops in the combined flop list file 434 and the top-level-net-names from the start netlist file in the chip Verilog database 310, for the nets connected to the Q output, and inputs SI, and SE of the flops. The top-level-net names are the flat net name for the signal net recognized by Astro™. It is noted that a single net may have several hierarchical names which must be accounted for. In addition, the signal driver information is generated for the SE pin driver that is connected to the SE input for all the existing flops. The connectivity for each pin of each of the flops in the combined flop list file 434 is determined and written out in an intermediate format to the flop connection file 518.

The flop location processing step 506 determines the location of the flops in the combined flop list file 434 by using the PDEF file 316 that contains coordinates. Note that the connection and unified flop database generation process 500 can be invoked in two modes. A first mode reads the PDEF file 316 when the program is invoked the first time to get the flop location information. In this mode, the program generates an intermediate flop location file 516. Once the intermediate flop location file 516 is ready, if the tool needs to be re-run, it can be invoked in a second mode where, instead of reading the PDEF file 316, the tool can directly read the intermediate flop location file 516. This can save considerable time by avoiding the parsing of the PDEF, if the combined flop list 434 and the flop placements already exist and have not changed.

In FIG. 5, the merging and processing step 508 eliminates potential regular expression issues downstream while carrying out a merge operation to produce a unified flop database 522. The merging and processing step 508 uses the following substitution rules which are later reversed by the final engine. First, all slash right brackets (\[) and slash left brackets (\]) are converted to temporary internal strings "vmropenbracket" and "vmrclosebracket", respectively. Second, all right brackets ([) and left brackets (]) are converted to the temporary internal strings "vmropenbracket" and "vmrclosebracket", respectively. The above substitutions eliminate potential downstream pattern match issues in Perl, The flop location processing step 506 and the merging and processing step 508 use Perl. Throughout the placement sensitive ECO process, a combination of TCL and Perl programming languages are used wherever they are efficient. For example, if there is parsing and regular expression processing to be done, the processing is coded in Perl. If there is netlist tracking processing, the processing is coded in TCL or using any vendor tool that allows database traversal.

In FIG. 5, the unified flop database 522 contains all the information for each flop that the downstream optimization engine requires. A sample set is shown in FIGS. 6A and 6B.

FIG. 6A illustrates database information for a previously existing flop. FIG. 6A contains a flop name 604, an X co-ordinate 605, a Y co-ordinate 606, a chain number 607 that the flop belongs to, and connection information, such as, a Q output signal net name 608, an SI input signal net name 609, an SE input signal net name 610, and an SE drive pin signal name 611.

FIG. 6B illustrates the database information for a new ECO flop with a flop name 624, an X co-ordinate 625, a Y co-ordinate 626, a chain number 627 listed as unassigned, a Q output signal net name 628 with the same signal net name as an SI input signal net name 629, an SE input signal net name 630 listed as "logic0", and an SE drive pin signal name 631 listed as "logic0/output". The optimization engine will identify all the flops with unassigned chains as candidates for chain allocation and optimization.

The optimization and post-processing step 216 of FIG. 2 reads a unified flop database, such as, the unified flop database 522 of FIG. 5 and allocates the new ECO flops to the existing chains in the presence of the allocation rules in a optimal placement-aware manner. Step 216 further produces a log file containing details of the optimization and generates an Astro™ ECO command file to carry out the ECO. The flop allocation is placement aware due to the need to minimize routing and buffering of signals, thereby reducing overall timing impact. It is noted that an ECO router is used to achieve this end and to ensure that the scan-in and scan-enable signals to all the new flops meet single cycle timing as a requirement for LogicBIST. Routing can be done by regular routing or ECO-routing. In regular routing, a whole block is re-routed afresh. This can disturb the timing considerably after a major ECO change. In ECO-routing, Astro is configured to only route the signals that have changed. ECO-routing is much less disruptive. The invention advantageously ensures that the changes made to the circuit to meet DFT rules are such that the timing/routing impact is minimal. Therefore, an ECO-router can easily route the design with minimal impact to the design.

Figure 7:
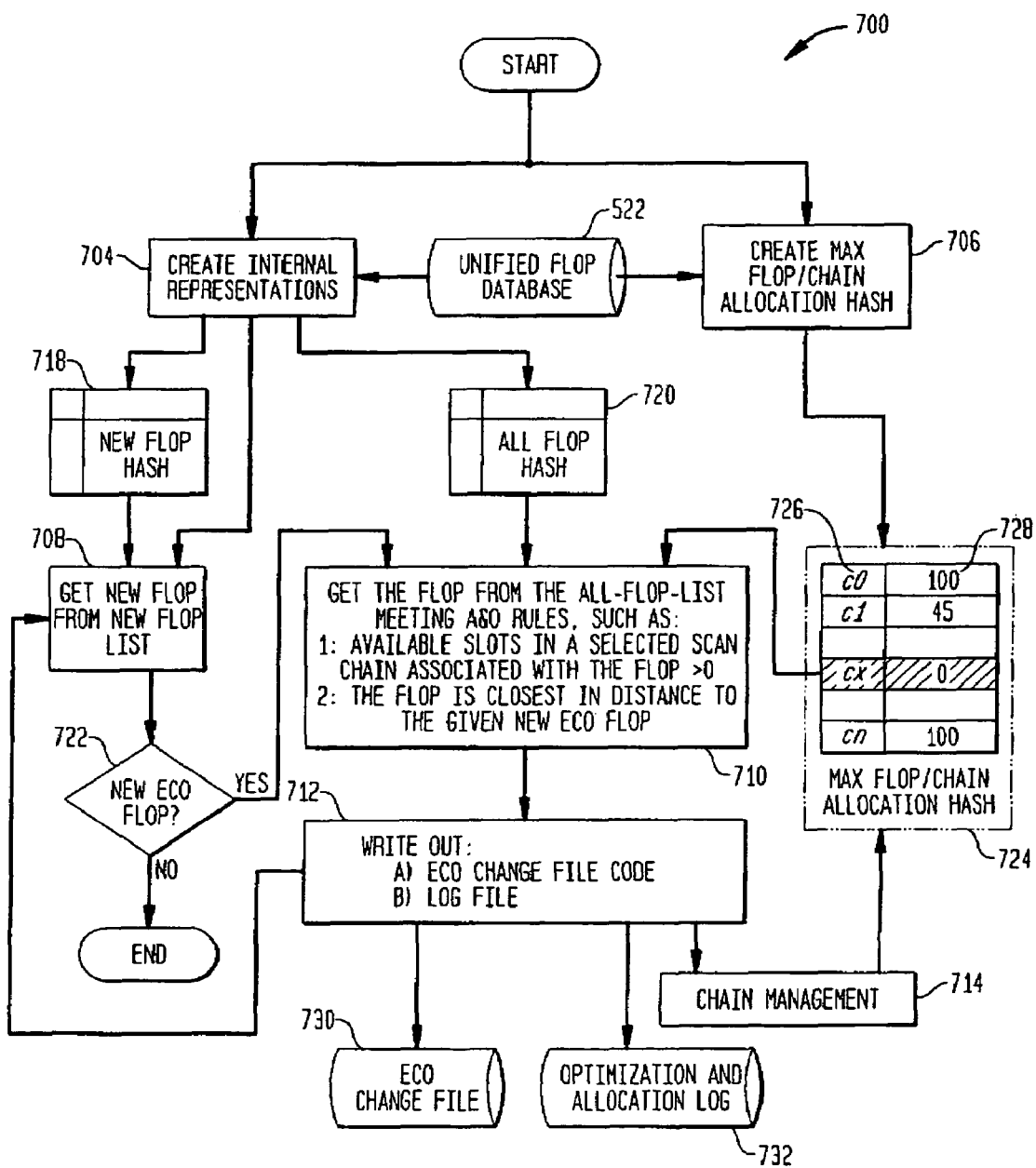
FIG. 7 illustrates an exemplary placement aware flop allocation and optimization process in accordance with an embodiment of thee present invention.

FIG. 7 illustrates an exemplary placement aware flop allocation and optimization process 700 in accordance with an embodiment of the present invention. This flop allocation and optimization process 700 involves allocating the new ECO flops, which are marked as being unassigned to any chain in the unified flop database 522 of FIG. 5, to existing scan chains so that the following requirements are satisfied. First, flop allocation should not break LogicBIST rules. This result is guaranteed at this stage because of the pruning carried out in the pre-processing stage. Thus, the allocation and optimization process 700 is free to allocate the new ECO flops to any chain available in the flop database. Second, the number of flops added to each of the chains, as a result of the allocation, should not exceed a user-specified maximum-new-flops-per-chain value. Third, the flops to be assigned to the respective positions in the chains should be placed in a placement-aware manner to minimize routing, avoid congestion, and timing impact. Note that one of the objectives is to minimize the connectivity to the SE and SI pins.

The flop allocation and optimization process 700 comprises a create internal representation step 704, a create max flop chain allocation hash step 706, a get new flop from new flop list step 708, a get flop step 710, a write out step 712, and a chain management step 714. The create internal representation step 704 and the create max flop chain allocation hash step 706 are shown as being done in parallel but can suitably be done in a sequential manner. The create internal representation step 704 reads in flop data from the unified flop database 522, initializes internal variables and data structures, and generates a new flop hash file 718 and an all flop hash file 720. The new flop hash file 718 contains a hash as an associative array data structure of the new flops. The all flop hash file 720 contains a hash of all the flops in the unified data base 522. The new flop hash file 718 and the all flop hash file 720 contain information concerning each flop, such as that indicated in FIGS. 6A and 6B.

The get new flop from new flop list step 708 selects a flop from the new flop hash file 718 and in decision step 727 determines if the selected flop is a new flop associated with the ECO. If the selected flop is a new ECO flop, then the process 700 proceeds to the get flop step 710.

The create max flop chain allocation hash step 706 reads in flop data from the unified flop database 522, generates, and initializes a max flop chain allocation hash file 724. The max flop chain allocation hash file 724 is made up of a list of chains by name, for example, c0 726, and the length of the chains, for example, 100 728. As described in more detail below, the max flop chain allocation hash file 724 is a dynamic file which is updated by the process as new flops are added to scan chains.

The get flop step 710 accesses flop data from the all flop hash file 720 and the max flop chain allocation hash file 724 and determines whether the selected flop from the all flop hash file 720 meets the allocation and optimization rules. For example, a first signal connection rule is that the available slots in the chain selected from the max chain allocation hash file 724 associated with the selected flop is greater than zero. Another signal connection rule, is that the selected flop from the all flop hash file 720 is closest in wiring distance to the new ECO flop determined from step 722 that it is to be connected with. The wiring distance is determined through use of the X and Y co-ordinates of each flop as indicated in FIGS. 6A and 6B. If a flop selected from the all flop hash file 720 does not meet the rules, another flop is selected from the all flop hash file 720. In write out step 712, an ECO change file code, suitable for use by a tool such as used in the Astro™ ECO process step 220 of FIG. 2 is written to an ECO chance file 730. The ECO change file 730 contains a set of instructions to a place and route tool to automatically make the connections. An optimization and allocation log file 732 is also written out in write out step 712. In chain management step 714, the available flop slot is decremented for the chain to which the new ECO flop was added. The allocation and optimization process 700 generates change files while respecting a maximum_new_flops_per_chain value. The optimization and allocation log file 732 may be output to a monitor, such as the monitor 112 of FIG. 1, or directed to a file.

The optimization and allocation log file 732 of FIG. 7 that was generated during allocation and optimization process 700 may suitably contain the following information for each flop as well as other or additional information as desired for a particular chip and manufacturing process. The name of the new ECO flop, the closest flop it will be connected to, the chain number to which the new ECO flop is inserted, and the distance between the new ECO flop and the closest flop it is connecting to. The distance is in the units contained in the PDEF file. For example, units of 0.001 micron may suitably be used dependent upon the chip manufacturing process. In the PDEF file, distances may be recorded as DISTANCE_UNIT 0.001.

Figure 8A:
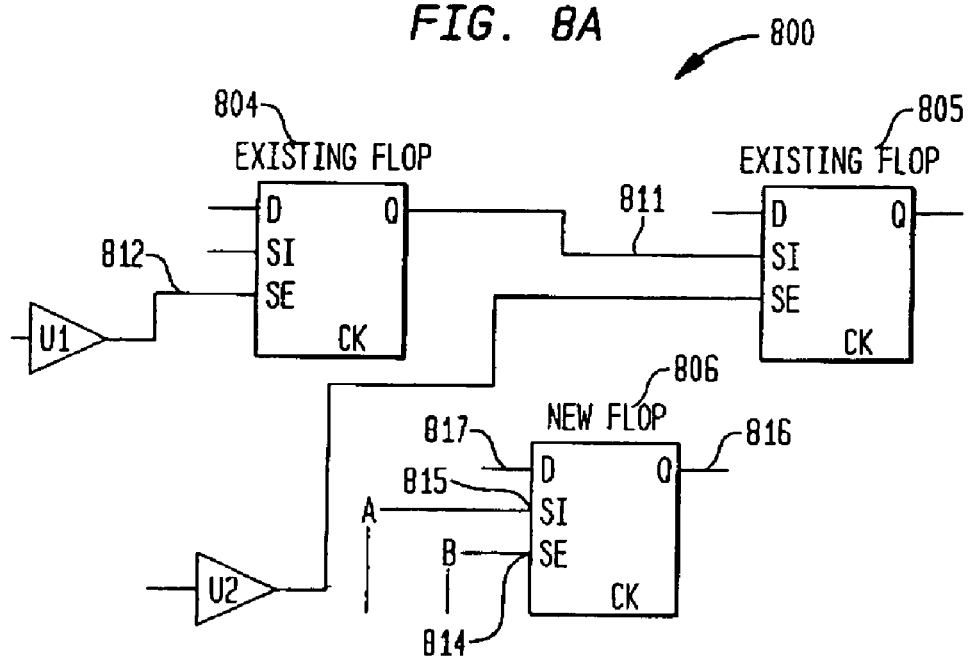
FIG. 8A illustrates an exemplary flop configuration as part of an engineering change order as an input to the placement sensitive ECO process in accordance with an embodiment of the present invention.
Figure 8B:
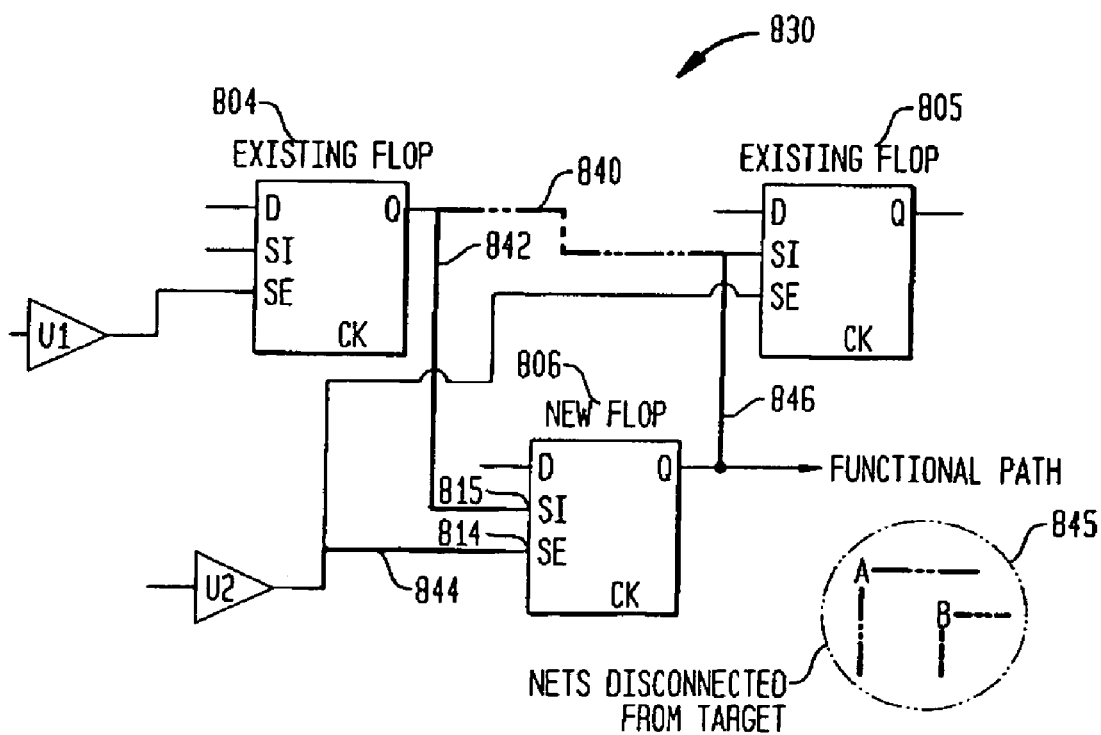
FIG. 8B illustrates the exemplary flop configuration of FIG. 8A after allocation and optimization in accordance with an embodiment of the present invention.

Exemplary optimization details are illustrated in FIGS. 8A and 8B. FIG. 8A illustrates an exemplary flop configuration 800 as part of an engineering change order to be provided as an input to the placement sensitive ECO process of the present invention. FIG. 8A shows existing flop 804, existing flop 805, and new ECO flop 806. The original scan signal path connections, such as SI path 811 and SE path 812, are shown before the optimization process. The SE pins 814 and SI pins 815 of the new ECO flop 806 are connected with pseudo connections since the new ECO flop 806 is not yet in the scan chain. The Q output 816 and D input 817 connections however are real functional paths.

FIG. 8B illustrates an exemplary flop configuration 830 after allocation and optimization in accordance with an embodiment of the present invention. It is assumed that the existing flop 805 is the closest flop to the new ECO flop 806. Original connections are shown using a dotted line, such as signal 840. New connections are shown in "bold", such as, signals 842, 844, and 846. The bold connection signals 842 and 844 are routed to ensure the shortest possible paths to the SI pin 815 and SE pin 814 of the new ECO flop 806, respectively. In a similar manner, a shortest possible path for signal 846 is routed to the SI pin of the existing flop 805. Circled area 845 illustrates the nets disconnected from the new ECO flop 806.

Figure 9:
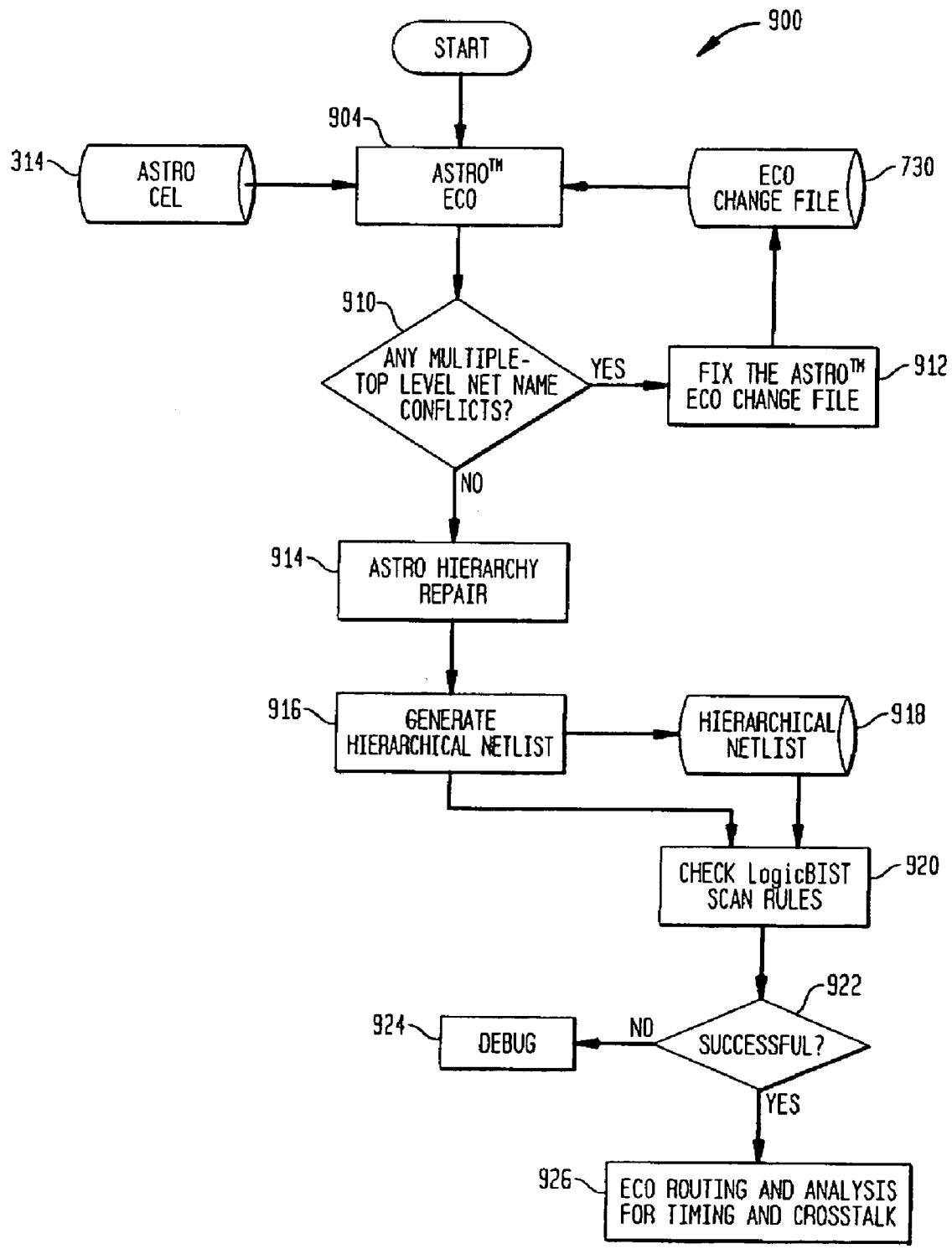
FIG. 9 illustrates an exemplary ECO process in accordance with an embodiment of the present invention.

FIG. 9 illustrates an exemplary ECO process 900 in accordance with an embodiment of the present invention. In the ECO process 900, the Astro™ ECO step 904 accesses the ECO change file 730 and the Astro™ CEL 314 to carry out the ECO. Depending on the chip design and ECO, manual intervention may occur in order to carry out the Astro™ ECO step 904. For example, multiple top-level net names may be encountered, such as may arise if the netlist has multiple hierarchical assign statements for the same logical device. A data structure tool, such as PrimeTime, may be used for top-level-net-name tracing to pick up one of the names, whereas Astro™ picked up a different name. In such cases, manual intervention may occur to select the name.

After the ECO has been processed in step 904, the chip hierarchy is repaired in step 914 and a netlist is generated in step 916. The netlist is then analyzed using a rule analyzer program, such as ruleAnalyze in step 920, to ensure compliance with LogicBIST rules. It is noted that any new I/Os were handled before step 920. If compliance is not achieved, as determined in decision step 922, the non compliance concern is debugged in step 924 to evaluate the concern. The debug step 924 may indicate a fundamental problem in which case the whole process may be reset to correct an error, for example, that may have occurred in the initial starting point. After ensuring compliance to the rules, the chip database, including the placement sensitive ECO modifications, is ECO routed and analyzed for timing and crosstalk in step 926.

The introduction of new flops to existing LogicBIST chains can cause the default maximum chain lengths to be exceeded. In order to proceed with the vector generation flow, the user needs to modify the chain-default in the vector generation tool to match the maximum chain length. The maximum chain length can be obtained by checking the log file produced by the rule analyzer program. Note that the rule analyzer program may generate warnings about the new chain lengths exceeding the previous default maximum. In the warning statement, it may also indicate the new chain-length for each chain exceeding the previous default maximum. At this point in the process, the debug step 924 initiates taking the resulting netlist through the DFT flow and confirming correctness.

Figure 10:
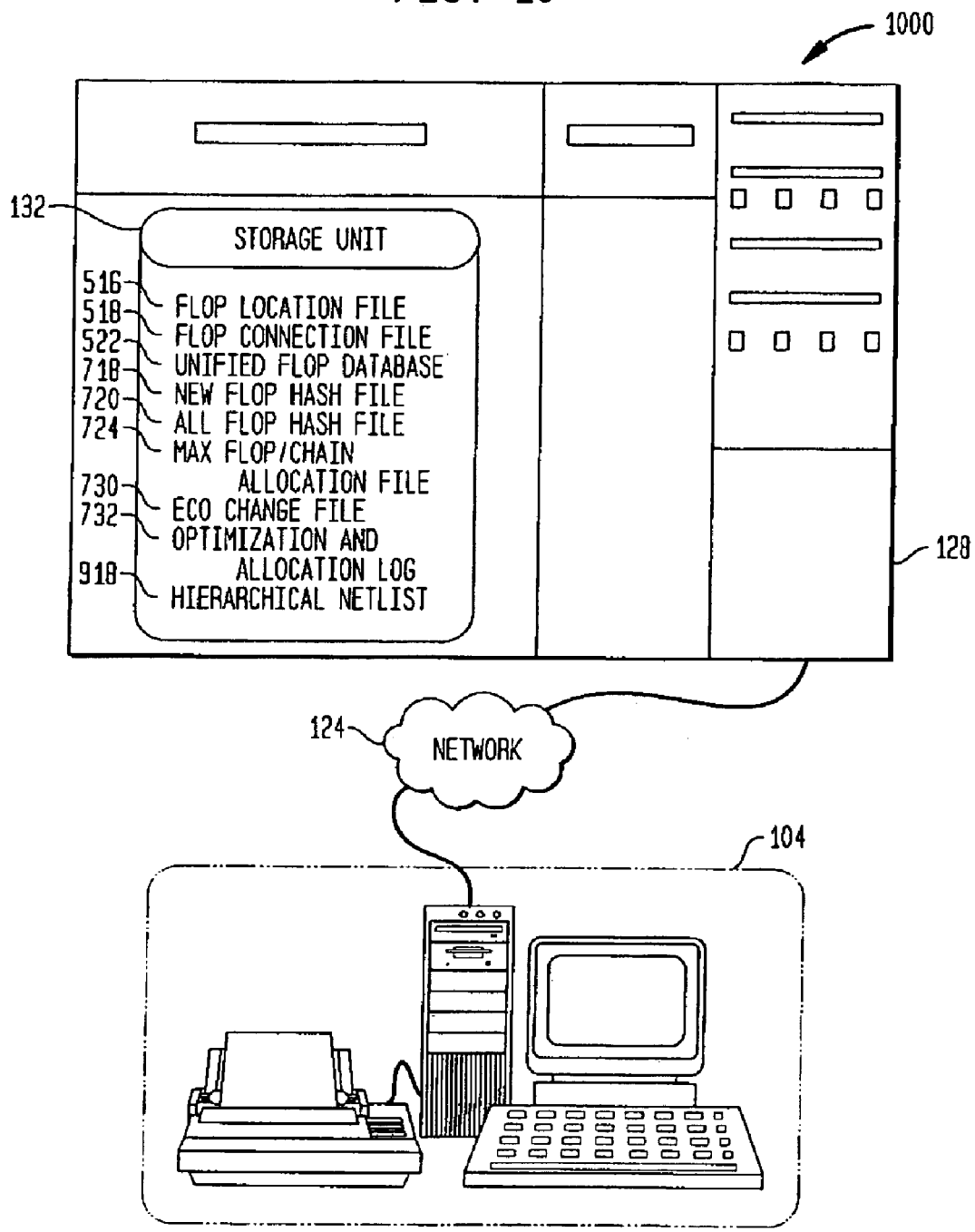
FIG. 10 illustrates the automatic change design system of FIG. 1 further comprising exemplary files and databases as shown in FIGS. 5, 7, and 9 in accordance with an embodiment of the present invention.

FIG. 10 illustrates the automatic change design system of FIG. 1 further comprising exemplary files and databases 516, 518, 522, 718, 720, 724, 730, 732, and 918 as shown in FIGS. 5, 7, and 9 in accordance with an embodiment of the present invention. It will be recognized that alternative storage units, distributed storage units, and other storage means may be employed for the storing of such files.

An example set of statistics for a chip with a large ECO, having 1,540 new ECO flops to be added to existing scan chains is shown in the following table. This table shows the distance distribution after flop allocation and optimization using a value for the maximum_new_flops_per_chain of 100. The distance measured is the distance between, for example, the new ECO flop 806 and the existing flop 805 of FIG. 8B. This table indicates that in the example chip there were a total of 1,540 flops that needed to be routed and corrected for DFT making use of the invention. Out of these 1,540 cases, only 9 cases needed a routing distance greater than 1,000 microns but less than 1,519 microns. Similarly only 6 cases were between 500 and 1,000 microns. As the table shows, the bulk of the routing for 1,380 flops was less than 50 microns. Therefore, the tool was extremely effective in correcting DFT problems and at the same time, minimizing the routing distance in a placement sensitive process. It is also noted that the chip design on which the invention was run was 9,000×9,000 microns in dimension and the 1,540 flops were scattered across the chip. From any standard of reference, this minimum level of impact even on such a large ECO, is extremely impressive. In fact, it was not apparent to us how it would be possible for us to do this logic modification without this invention.

| Number | Distance Range (microns) | Number of Cases (total 1,540) |
|---|---|---|
| 1 | 1,000 <= D < 1,519 | 9 |
| 2 | 500 <= D < 1,000 | 6 |
| 3 | 200 <= D < 500 | 36 |
| 4 | 100 <= D < 200 | 38 |
| 5 | 50 <= D < 100 | 71 |
| 6 | 0 <= D < 50 | 1,380 |

While the present invention has been disclosed in a presently preferred context, it will be recognized that the present teachings may be adapted to a variety of contexts consistent with this disclosure and the claims that follow.

For example, the present invention is disclosed mainly in the context of placement sensitive logic modifications to an existing design. It will appreciated that it may also be employed with alternative implementation technologies, such as, field programmable gate array designs to minimize impact to existing placed and programmed sections of the design not affected by an engineering change. It will also be appreciated that variations in the particular hardware and software employed are feasible, and to be expected as both evolve with time. For example, placement, routing, and timing analysis tools are expected to evolve with time and technology developments. Other such modifications and adaptations to suit a particular design application will be apparent to those of ordinary skill in the art.

We claim:

1. A method executed by a chip-design system for making a placement sensitive engineering change to meet design for test requirements, the method comprising:
   placing a set of new flops in an already placed chip design to meet functional requirements of an engineering change;
   pruning the already placed chip design to create a set of valid flops and valid scan chains based on a set of pruning rules;
   generating a unified flop database containing physical location and connection information for the new flops and the set of valid flops;
   generating a change file for the new flops, selected valid flops, and valid scan chains associated with the selected valid flops meeting allocation and placement sensitive signal connection rules; and
   connecting the new flops to the selected valid flops allowing design for test requirements to be met.

2. The method of claim 1 wherein the set of pruning rules comprises:
   pruning flops and scan chains associated with at least one dedicated isolation data exchange format wrapper flop.

3. The method of claim 1 wherein the set of pruning rules comprises:
   pruning flops and scan chains associated with at least one shared isolation chain.

4. The method of claim 1 wherein the set of pruning rules comprises:
   pruning multi-cycle flops and scan chains.

5. The method of claim 1 wherein the set of pruning rules comprises:
   pruning memory built in self test flops and scan chains.

6. The method of claim 1 wherein the set of pruning rules comprises:
   pruning logic built in self test controller flops and scan chains.

7. The method of claim 1 wherein the pruning comprises:
   collecting a list of flops which form shared isolation wrappers in a shared isolation flop file; and
   correcting names of flops in the shared isolation flop file which do not match flop names in an original chip netlist.

8. The method of claim 7 wherein the pruning further comprises:
   parsing a scan definition file to collect scannable flops from floating and ordered groups of flops;
   parsing logic built in self test sub-chains to obtain a list of multi-cycle scan chains;
   parsing the shard isolation flop file; and
   generating a pruned permitted flop list.

9. The method of claim 8 wherein the generating a unified flop database comprises:
   concatenating the pruned permitted flop list with a list of the new flops to produce a combined flop list;
   generating connection information for the flops in the combined flop list in a flop connection file;
   determining locations for the flops in the combined flop list in a flop location file; and
   merging the flop connection file and flop location file to create the unified flop database.

10. The method of claim 1 wherein the allocation and placement sensitive signal connection rules comprise:
    determining that number of available slots in a selected valid scan chain is greater than zero.

11. The method of claim 1 wherein the allocation and placement sensitive signal connection rules comprise:
    determining that a flop selected from the already placed chip design is closest in distance to a new flop.

12. A system for implementing a placement sensitive engineering change to meet design for test requirements the system comprising:
    a chip database for storing an already placed chip design;
    an engineering change database for storing all engineering change order for the already placed chip design;
    a tool database and a programmed processor comprising:
       means for placing a set of new flops in the already placed chip design to meet functional requirements of an engineering change;
       means for pruning the already placed chip design to create a set of valid flops and valid scan chains based on a set of pruning rules;
       means for generating a unified flop database containing physical location and connection information for the new flops and set of valid flops;
       means for generating a change file for the new flops, selected valid flops, and valid scan chains associated with the selected valid flops meeting allocation and placement sensitive signal connection rules; and
       means for connecting the new flops to the selected valid flops allowing design for test requirements to be met.

13. The system of claim 12 wherein the programmed processor is a server which has access to the chip database, the engineering change database, and the tool database.

14. A computer-readable medium storing a computer program which causes a computer system to perform a method for making a placement sensitive engineering change to meet design for test requirements, the computer-readable medium comprising:
    placing a set of new flops in an already placed chip design to meet functional requirements of an engineering change;

pruning the already placed chip design to create a set of valid flops and valid scan chains based on a set of pruning rules;

generating a unified flop database containing physical location and connection information for the new flops and the set of valid flops;

generating a change file for the new flops, selected valid flops, and valid scan chains associated with the selected valid flops meeting allocation and placement sensitive signal connection rules; and connecting the new flops to the selected valid flops allowing design for test requirements to be met.

15. The computer-readable medium of claim 14 wherein the set of pruning rules comprises:

pruning flops and scan chains associated with at least one dedicated isolation data exchange format wrapper flop; and pruning flops and scan chains associated with at least one shared isolation chain.

16. The computer-readable medium of claim 14 wherein the set of pruning rules comprises:

pruning multi-cycle flops and scan chains.

17. The computer-readable medium of claim 14 wherein the set of pruning rules comprises:

pruning memory built in self test flops and scan chains; and pruning logic built in self test controller flops and scan chains.

18. The computer-readable medium of claim 14 wherein the pruning comprises:

collecting a list of flops which form the shared isolation wrappers in a shared isolation flop file;

correcting the names of flops in the shared isolation flop file which do not match the corresponding flop names in an original chip netlist;

parsing a scan definition file to collect scannable flops from floating and ordered groups of flops;

parsing logic built in self test sub-chains to obtain a list of multi-cycle scan chains;

parsing the shard isolation flop file; and generating a pruned permitted flop list.

19. The computer readable medium of claim 18 wherein the generating a unified flop database comprises:

concatenating the pruned permitted flop list with a list of the new flops to produce a combined flop list;

generating connection information for the flops in the combined flop list in a flop connection file;

determining locations for the flops in the combined flop list in a flop location file; and merging the flop connection file and flop location file to create the unified flop database.

20. The computer readable medium of claim 14 wherein the allocation and placement sensitive signal connection rules comprise:

determining that number of available slots in a selected valid scan chain is greater than zero; and determining that a flop selected from the already placed chip design is closest in distance to a new flop.

* * * * *